United States Patent
Micklash, II et al.

(10) Patent No.: US 6,488,610 B2
(45) Date of Patent: Dec. 3, 2002

(54) HYDRAULIC CONTROL FOR A 5-SPEED AUTOMATIC TRANSMISSION

(75) Inventors: Kenneth J. Micklash, II, Royal Oak, MI (US); Robert Charles Downs, La Jolla, CA (US); James Kevin Mainquist, Troy, MI (US); David Allen Blenc, Shelby Township, Macomb County, MI (US)

(73) Assignee: General Motors Corporation, Detroit, MI (US)

( * ) Notice: Subject to any disclaimer, the term of this patent is extended or adjusted under 35 U.S.C. 154(b) by 63 days.

(21) Appl. No.: 09/735,665

(22) Filed: Dec. 14, 2000

(65) Prior Publication Data

US 2002/0077208 A1 Jun. 20, 2002

(51) Int. Cl.[7] .......................... F16H 61/26; F16H 31/00
(52) U.S. Cl. ........................................ 477/131; 475/127
(58) Field of Search ................................. 475/127, 133, 475/143; 477/70, 71, 155, 131

(56) References Cited

U.S. PATENT DOCUMENTS

| | | | | |
|---|---|---|---|---|
| 4,494,423 A | * | 1/1985 | McCarthy et al. | 475/133 X |
| 5,188,570 A | * | 2/1993 | Wakahara | 475/143 |
| 5,293,790 A | * | 3/1994 | Ohashi et al. | 477/131 X |
| 5,537,887 A | * | 7/1996 | Jang et al. | 477/131 X |
| 5,588,327 A | * | 12/1996 | Downs et al. | 477/155 X |
| 5,643,125 A | * | 7/1997 | Long et al. | 475/127 |
| 5,681,241 A | * | 10/1997 | Kubo et al. | 477/130 |
| 5,820,507 A | * | 10/1998 | Younger | 475/116 |
| 5,876,303 A | * | 3/1999 | Yu | 477/131 X |
| 5,895,334 A | * | 4/1999 | Yu | 475/128 |
| 5,921,888 A | * | 7/1999 | Park | 477/131 |
| 5,984,818 A | * | 11/1999 | Ryu | 475/132 |
| 5,984,825 A | | 11/1999 | Hebbale et al. | 475/286 |
| 6,007,445 A | * | 12/1999 | Kichhoffer et al. | 475/116 |
| 6,007,457 A | * | 12/1999 | Yu | 477/149 |
| 6,027,427 A | * | 2/2000 | Yoo | 477/130 |
| 6,299,560 B1 | * | 10/2001 | Fujioka et al. | 475/119 |
| 6,302,822 B1 | * | 10/2001 | Suzuki et al. | 477/143 |

* cited by examiner

*Primary Examiner*—Charles A Marmor
*Assistant Examiner*—Roger Pang
(74) *Attorney, Agent, or Firm*—Leslie C. Hodges

(57) ABSTRACT

An electro-hydraulic control system for an automatic transmission comprises a manual selector valve for operator direction of line pressure fluid to a drive passage when drive is selected or to a reverse passage when reverse is selected. A drive/reverse passage connects the drive passage and the reverse passage. A first check ball is disposed between the drive passage and the drive/reverse passage and a second check ball is disposed between the reverse passage and the drive/reverse passage wherein the check balls operate to pressurize the drive/reverse passage when either drive or reverse is selected. The system further includes six fluid operated selectively engageable friction devices, three friction device actuators each associated with one of the six friction devices, in parallel relation and electronically actuated to direct fluid from the drive passage to the respective friction device, and a two-friction device actuator operative to direct fluid from the drive/reverse passage to one of two friction devices. Three pressure-operated feed protection valves are disposed intermediate of two of the actuators and their two friction devices, which operate to prevent flow to the two downstream friction devices.

11 Claims, 2 Drawing Sheets

| | C1 | C2 | C3 | B1 | B2 | B3 |
|---|---|---|---|---|---|---|
| 1st | X | | | | | X |
| 2 nd | X | | | | X | |
| 3 rd | X | X | | | | |
| 4 th | | X | | | X | |
| 5 th | | X | | X | | |
| Reverse | | | X | | | X |

X = friction device engaged

| GEAR STATE | C1 actuator | C2 actuator | B2 actuator | B1/B3 actuator | Mode V. actuator |
|---|---|---|---|---|---|
| 1st | | X | X | | X |
| 2 nd | | X | | X | |
| 3 rd | | | X | X | |
| 4 th | X | | X | | |
| 5 th | X | | | X | |
| Reverse | X | X | X | | X |

X = actuator is energized
Note: Mode valve actuator is normally closed: when energized, fluid flows through.

HYDRAULIC CONTROL FOR A 5-SPEED AUTOMATIC TRANSMISSION

TECHNICAL FIELD

This invention relates to transmission controls for a power transmission.

BACKGROUND OF THE INVENTION

Power transmissions of the automatic shifting type have a plurality of selectively establishable gear ratios between the engine and ground engaging mechanism for the vehicle. The ratios are generally established by hydraulically operated friction devices such as clutches and brakes. The engagement and disengagement of these friction devices are controlled by valve mechanisms which direct hydraulic fluid to and from the operating piston of the devices. With the advent of electronically controlled transmissions, each valve mechanism is controlled by a separate electrical element such as a solenoid. In the event one of the valve-controlling solenoids becomes inoperative, it is desirable for the transmission control system to ensure that only allowed combinations of friction devices may be engaged simultaneously so not more than one drive ratio occurs.

SUMMARY OF THE INVENTION

The present invention provides a transmission control system for an automatic transmission, which ensures that simultaneous establishment of more than one drive ratio does not occur.

The control system comprises a manual selector valve for operator direction of line pressure fluid to a drive passage when drive is selected or to a reverse passage when reverse is selected. A drive/reverse passage connects the drive passage and the reverse passage. A first check ball is disposed between the drive passage and the drive/reverse passage and a second check ball is disposed between the reverse passage and the drive/reverse passage wherein the check balls operate to pressurize the drive/reverse passage when either drive or reverse is selected. The system further includes six fluid operated selectively engageable friction devices and three friction device actuators each associated with one of the six friction devices, in parallel relation and electronically actuated to direct fluid from the drive passage to the respective friction device. The system also includes a two-friction device actuator operative to direct fluid from the drive/reverse passage to one of two friction devices where a mode valve and associated actuator determine which of the two friction devices are pressurized. Three pressure-operated feed protection valves are disposed intermediate of two of the actuators and their two friction devices. Each feed protection valve may receive at least one signal pressure by open actuators feeding downstream friction devices. The signal pressures shift the valve to prevent flow to downstream friction devices which are incompatible to be engaged simultaneously.

The system minimizes the number of components while still ensuring the transmission is protected against any combination of actuator interruption.

DESCRIPTION OF THE PREFERRED EMBODIMENT

Figures 1, 2, 4:
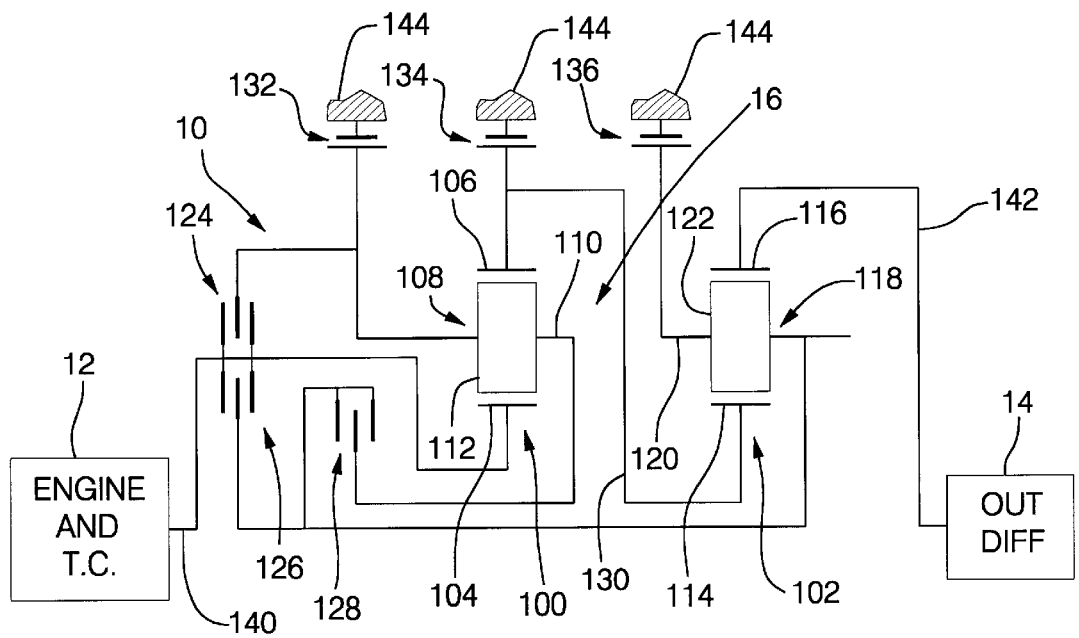
FIG. 1 is a schematic representation of a powertrain compatible with the present invention transmission control system.
FIG. 2 is a chart of the combination of engaged friction devices for each gear of the planetary gear arrangement.
FIG. 4 is a chart of the combination of actuators energized for each gear.

A powertrain 10 is shown in FIG. 1 and comprises an engine and torque converter 12 including a torque converter clutch, an output differential 14, and a multi-speed planetary gear arrangement 16. The engine and torque converter 12 are conventional devices, and the planetary gear arrangement 16 is constructed preferably in accordance with that shown in U.S. Pat. No. 5,984,825 issued to Hebbale et al. and assigned to the assignee of the present invention.

The planetary gear arrangement 16 has a first planetary gearset 100 and a second planetary gearset 102. The planetary gearset 100 has a sun gear 104, a ring gear 106 and a planet carrier assembly 108. The planet carrier assembly 108 has a cage or spider 110 on which is rotatably mounted a plurality of single pinions 112.

The planetary gearset 102 has a sun gear 114, a ring gear 116 and a planet carrier assembly 118. The planetary carrier assembly 118 includes a planet cage 120 on which is rotatably mounted a plurality of single pinions 122 meshing with the sun gear 114 and the ring gear 116. The ring gear 116 is connected through an output hub and shaft 142 to the differential 14.

The planetary gear arrangement 16 includes six conventional fluid-operated friction devices, three being illustrated and designated as clutches: C1 clutch 128, C2 clutch 126, C3 clutch 124, and three as brakes: B1 brake 132, B2 brake 134, B3 brake 136, which are well known in the art. The brakes are depicted schematically as band type brakes, however, it is well known to utilize a disc type friction brake in place of a band brake in the transmission art.

The engine and torque converter 12 are drivingly connected with a transmission input shaft 140 which is continuously driven with the sun gear 104 and is selectively drivingly connected with C2 clutch 126 and C3 clutch 124. The C3 clutch 124 is connected with the planet carrier assembly 108 and C2 clutch 126 is connected with the planet carrier assembly 118. Carrier assembly 108 is connectable with the carrier assembly 118 through selectively engageable C1 clutch 128. The sun gear 114 and ring gear 106 are continuously drivingly interconnected through a torque transmitting member 130.

The planetary carrier assembly 108 is selectively held stationary by selectively engageable friction B1 brake 132 connected with the transmission housing 144. The ring gear 106 and sun gear 114 are selectively held stationary through selectively engageable friction B2 brake 134 and the carrier assembly 118 is selectively held stationary by selectively engageable friction B3 brake 136.

The planetary gear arrangement 16 provides five forward speed ratios and one reverse transmission ratio with the appropriate pair of friction devices engaged as charted in FIG. 2. The first forward speed ratio is provided with the actuation of C1 clutch 128 and B3 brake 136. This establishes the planet carrier assemblies 108 and 118 as reaction members, such that the input drive to the sun gear 104 which is continuously driven by the input shaft 140 is reversed through the ring gear 106 and then again, the sun gear 114 to ring gear 116 reverses the output back to a forward direction resulting in a reduced forward drive ratio at the differential 14.

The second forward drive ratio is established by disengaging B3 brake 136 and engaging B2 brake 134 which establishes the ring gear 106 as a reaction member in the planetary gearset as well as the sun gear 114. Thus, a reduced speed at the carrier assembly 108 is directed to the carrier assembly 118 which results in a reduced forward transmission ratio at the output differential 14.

The third forward drive ratio is established by disengaging B2 brake 134 while engaging C2 clutch 126. The engagement of C1 clutch 128 and C2 clutch 126 results in a direct drive ratio through the planetary gear arrangement 16.

The fourth forward drive ratio is established by releasing C1 clutch 128, engaging B2 brake 134 and maintaining C2 clutch 126 engaged. This results in the planetary gearset 102 providing an overdrive ratio between the input shaft 140 and the output shaft 142.

The fifth and highest forward transmission ratio is provided by engaging B1 brake 132 while disengaging B2 brake 134 and maintaining C2 clutch 126. This establishes the planet carrier assembly 108 as a reaction member, such that the ring gear 106 is driven in a direction opposite to the input shaft 140 which results in reverse rotation of the sun gear 114 and therefore an increased overdrive ratio of the ring gear 116.

The planetary gear arrangement 16 provides a reverse drive ratio through the actuation of B3 brake 136 and C3 clutch 124. With C3 clutch 124 engaged, the entire planetary gearset 100 operates at a direct drive ratio resulting in the sun gear 114 being driven forwardly at the speed of the input shaft 140 and a reverse ratio being directed from the ring gear 116 to the output differential 14 since the planet carrier assembly 118 is held stationary.

Figure 3:
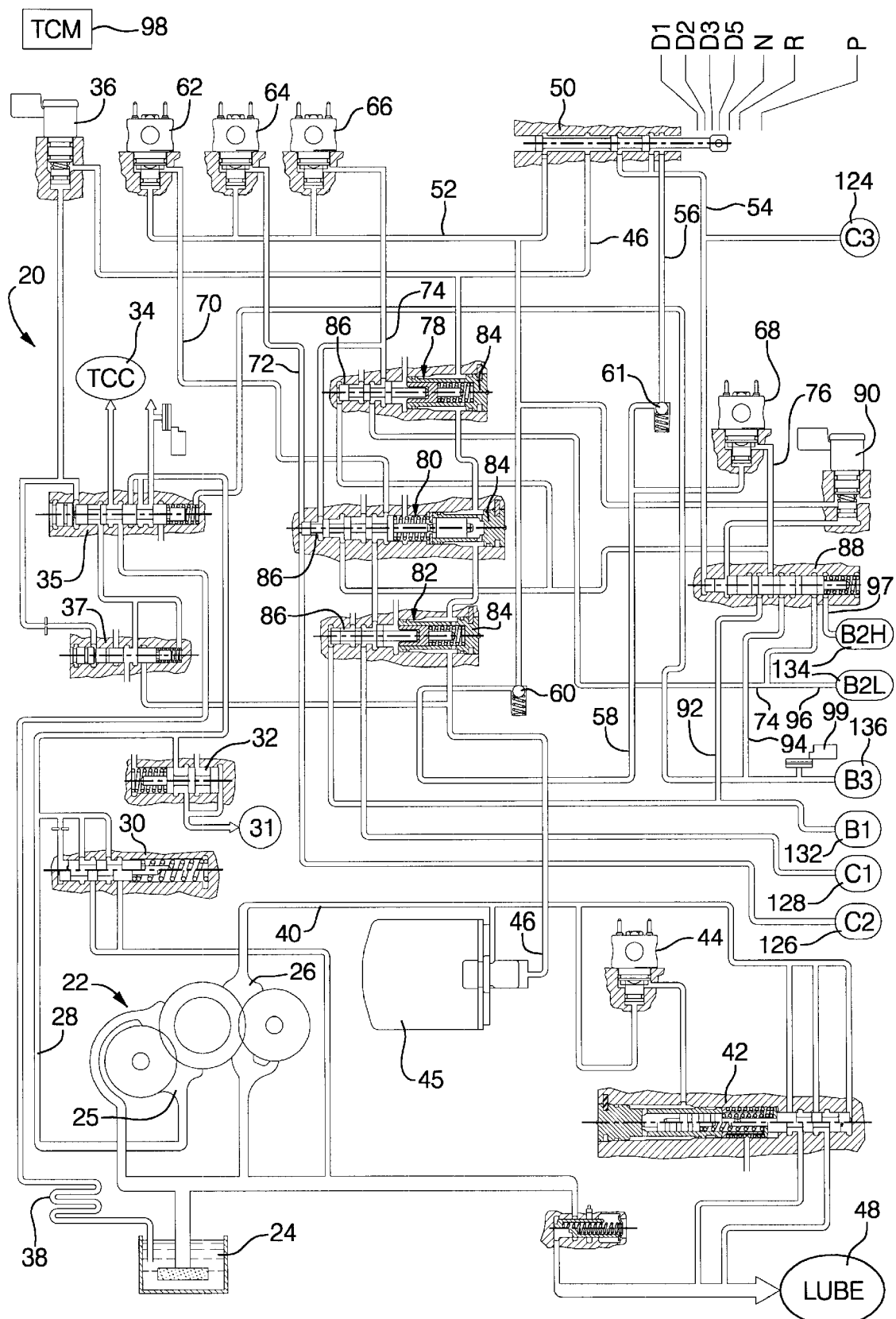
FIG. 3 is a diagrammatic representation depicting the transmission control system of the present invention.

The engagement and disengagement of the fluid-operated friction devices are controlled through an electro-hydraulic control system 20 of the present invention, diagrammed schematically in FIG. 3.

The electro-hydraulic control system 20 includes a positive displacement pump 22 such as a triple X style pump having one suction drawing fluid from a reservoir 24 and two flow outlets 25,26. The pump 22 delivers fluid pressure from one pump outlet 25 to a torque converter clutch (TCC) feed passage 28 with the pressure limited by a TCC feed limit valve 30. The TCC feed passage 28 delivers fluid to a centrifugal dam circuit 31 through a centrifugal dam limit valve 32. The TCC feed passage 28 also delivers fluid to engage the TCC 34, which is incorporated in a conventional manner in the torque converter, as directed by a TCC control valve 35, TCC control solenoid 36, and TCC apply valve 37. Exhausted flow through the TCC control valve 35 is delivered on to a transmission cooler 38.

The second pump outlet 26 provides a source of line fluid pressure to an unfiltered passage 40. The unfiltered passage 40 connects with a main pressure regulator 42 and a line pressure solenoid 44. The unfiltered passage 40 is also connected through a filter 45 to deliver filtered fluid to a main pressure passage 46. The line control solenoid 44 and regulator valve 42 are operable in a well known manner to regulate the pressure in the main passage 46. Excess flow from the pump 22 in the unfiltered passage 40 is exhausted through the main pressure regulator valve 42 to a lubrication portion 48 of the hydraulic circuit. The main passage 46 provides line pressure to the TCC control solenoid 36 and to the TCC apply valve 37.

The main passage 46 is in fluid communication with a manual selector valve 50. The manual valve 50 is a conventional, operator control, which permits the operator to manipulate the transmission between park "P", reverse "R", neutral "N" and a plurality of forward drive positions "D1, D2, D3, D5". Depending on the position of the manual valve 50, the incoming line pressure from the main passage 46 is in fluid communication with either a downstream drive passage 52, or an NPR passage 54 connected to C3 clutch 124, or the NPR passage 54 and a reverse passage 56. The manual valve 50 operates to prevent fluid from being directed to the forward friction devices when reverse is selected and to the reverse friction devices when drive is selected.

The drive and reverse passages 52,56 are connected by a drive/reverse passage 58, with a one-way drive check ball valve 60 disposed between the drive passage and the drive/reverse passage and a one-way reverse check ball valve 61 disposed between the drive/reverse passage and the reverse passage 56. When "drive" is selected, the drive passage 52 is pressurized and the fluid displaces the drive check ball 60 to pressurize the drive/reverse passage 58, but is blocked from entering the reverse passage 56 by the reverse check ball 61. Likewise, when reverse is selected, pressurized fluid flows through the reverse passage 56, displacing the reverse check ball 61 and pressurizing the drive/reverse passage 58, but is blocked from entering the drive passage 52 by the drive check ball 60.

The hydraulic control system 20 further includes four friction device actuators referred to individually as C1 actuator 62, C2 actuator 64, B2 actuator 66, and B1/B3 actuator 68. The actuators are variable output pressure solenoid valves preferably of the pulse-width modulated type, which when actuated, prohibit flow therethrough. In their unenergized state, the actuators are open to deliver pressurized fluid to their respective clutches and brakes. In particular, C1, C2, and B2 actuators 62–66 are arranged in parallel to receive fluid from the drive passage 52 downstream of the manual valve 50. The B1/B3 actuator 68 is arranged to receive fluid from the drive/reverse passage 58, interconnecting the drive and reverse passages 52,56 downstream of the manual valve 50. The C1 actuator 62 delivers fluid to a C1 feed passage 70; the C2 actuator 64 to a C2 feed passage 72; the B2 actuator 66 to a B2 feed passage 74; and the B1/B3 actuator 68, which is operational to actuate either B1 brake 132 or B3 brake 136, delivers fluid to a B1/B3 feed passage 76. Since B1 brake 132 is engaged for $5^{th}$ gear and B3 brake 136 for $1^{st}$ gear and reverse, the two check balls 60,61 allow fluid to reach the B1/B3 actuator 68 when either drive or reverse is selected.

Further included in the hydraulic control system 20 are three pressure-operated, feed protection mode valves designated F1 valve 78, F2 valve 80, and F3 valve 82, which are utilized to prevent inappropriate combinations of friction devices to apply simultaneously in case one or more of the friction device actuators 62–68 becomes inoperative. Each feed protection valve 78–82 includes a reference pressure side 84 and an opposing signal pressure side 86. A spring biases each of the feed protection valves 78–82 towards the signal pressure side 86, referred to as spring set position. Each feed protection valve operates based on pressure imbalance across the valve such that when the signal pressure is greater than the reference pressure, the valve compresses the spring and shifts to a pressure set position.

The main passage 46, carrying line pressurized fluid, is fed through the reference pressure side 84 of each feed protection valve 78–82 upstream of the manual valve 50, providing the reference pressure. Each feed protection valve 78–82 includes one or more friction device feed passages, routed to the signal pressure side 86 of the valve to provide signal pressure. Further each feed protection valve includes one of the friction device passages extending therethrough, which the valve blocks when the signal pressure is greater than the sum of the reference pressure and the valve spring force.

In particular, the C1 feed passage 70 extends from the C1 actuator 62, through the F2 valve 80 and through the F3 valve 82, to C1 clutch 128. Therefore the C1 feed passage 70 is blockable by either the F2 or F3 valves 80,82. The C2 feed passage 72 is routed through the signal side 86 of the F2 valve 80 before connecting to C2 clutch 126 to provide a signal pressure to the F2 valve without the blockability function. The B2 feed passage 74 extends from the B2 actuator 66, through the F1 valve 78, to B2 brake 134 and is blockable by the F1 valve. The B2 feed passage 74 is also routed upstream of the F1 valve 78 to the signal side 86 of the F2 valve 80 to provide signal pressure to the F2 valve. The B1/B3 feed passage 76 is connected to the signal sides 86 of both the F1 and F2 valves 78,80 to provide a signal pressure to both feed protection valves. The F3 valve 82 receives a signal pressure from a passage downstream of the B1/B3 passage as described further below. Therefore the F1 and F3 valves 78,82 each may receive only a single pressure signal, which is sufficient to shift the valves. In comparison the F2 valve 80 may receive up to three pressure signals, where two of the three are required to shift the valve.

The electro-hydraulic control system 20 includes a multiplex mode valve 88 and a mode valve actuator 90, which when energized, permits flow therethrough from the drive passage 52 of the manual valve 50 to deliver a pressure signal to a signal end of the multiplex mode valve. Therefore the mode valve actuator 90 is closed in its de-energized state. The NPR passage 54 from the manual valve 50 also terminates at the signal end of the mode valve 88 for shifting the mode valve when the NPR passage is pressurized. Therefore the mode valve 88 may receive two pressure signals.

The B1/B3 feed passage 76 from the B1/B3 actuator 68 also extends to the mode valve 88 and based on the mode valve position, communicates fluid from the B1/B3 feed passage to either a B1 feed passage 92 or a B3 feed passage 94. The B1 feed passage 92 is in communication with B1 brake 132 and the signal side 86 of the F3 valve 82 to provide a signal pressure thereto. The B3 feed passage 94 is in communication with B3 brake 136 and to the signal pressure end of the TCC control valve 35. This ensures that the TCC 34 cannot be applied if the transmission is in 1$^{st}$ gear or reverse—the two instances where the B3 brake 136 is engaged. The default position of the mode valve 88 puts the B1/B3 feed passage 76 in fluid communication with B1 feed passage 92 as the mode valve actuator default position is closed.

The B2 brake 134 may be a brake having a dual area piston, not shown, to vary the torque applied between either a default, low level or a high level torque. Therefore the B2 feed passage 74 is routed from the F1 valve 78 directly to a low B2 feed 96. The B2 feed passage 74 is also connected to a high B2 feed passage 97 through the mode valve 88, whereupon actuation of the mode valve, fluid is routed to both the low and high B2 feed passages 96,97 to apply fluid pressure to both areas of the B2 brake piston.

The electronic controls of the control system 20 are shown as a transmission control module (TCM) 98, a conventional programmable digital computer. The TCM 98 is connected to electrically control the line pressure solenoid 44, the TCC control solenoid 36, the C1, C2, B2, and B1/B3 actuators 62–68, and the mode valve actuator 90.

A pressure switch 99 is disposed in the B3 feed passage 94 upstream of B3 brake 136 to detect when the passage is pressurized. If pressure is detected when it is not commanded, the TCM 98 may either turn on the B1/B3 actuator 68 to stop flow therethrough or turn off the mode valve actuator 90 to switch flow to the B1 feed passage 92. The pressure switch 99 ensures that single transition skip shifts (ex. 2$^{nd}$ to 4$^{th}$, 3$^{rd}$ to 5$^{th}$ gear), where one friction device is maintained engaged and a second friction device is disengaged simultaneously as a third friction device is engaged, are possible. As shown in FIG. 2, the B3 brake 136 is not engaged for 2$^{nd}$ through 5$^{th}$ gears.

When the transmission is operating in drive, filtered fluid is pumped through the main passage 46, through the reference pressure side 84 of F3, F2, and F1 valves 82,80,78, and through the manual valve 50 to the drive passage 52. The fluid in the drive passage 52 displaces the drive check ball 60 to pressurize the drive/reverse passage 58.

With reference to FIG. 4, actuator operation for each gear is discussed. To engage first gear, the TCM 98 electronically signals the C2 and B2 actuators 64,66 to stop flow therethrough. Therefore the C1 actuator 62 is open to flow through the F2 and F3 valves 80,82 to engage C1 clutch 128 and the B1/B3 actuator 68 is open to permit fluid flow therethrough. The mode valve actuator 90 is energized to displace the mode valve 88 to direct flow from the B1/B3 passage 76, through the B3 feed passage 94, to B3 brake 136. Note the B1/B3 feed passage 76 provides a signal pressure to F2 valve 80.

For second gear, the TCM 98 electronically signals the C2 and B1/B3 actuators 64,68 to stop flow therethrough. Therefore the C1 actuator 62 and B2 actuator 66 are open to flow to engage C1 clutch 128 and B2 brake 134. Note that B2 feed passage 74 is providing one signal pressure to the F2 valve 80, which alone is insufficient to shift the F2 valve and therefore does not close the C1 feed passage 70. If high torque is demanded for B2 brake 134, the mode valve actuator 90 is modulated to shift the mode valve 88 to direct additional flow from the B2 feed passage 74 to the high B2 line 97.

In third gear, the B2 actuator 66 and B1/B3 actuator 68 are energized to stop flow therethrough. The C1 and C2 actuators 62,64 permit flow therethrough to engage C1 clutch 128 and C2 clutch 126. Like second gear, there is one signal pressure to the F2 valve 80, here provided by C2 feed passage 72, but this is insufficient to shift the F2 valve.

For fourth gear, the C1 actuator 62 and B1/B3 actuator 68 are energized to stop flow therethrough. The C2 and B2 actuators 64,66 permit flow therethrough to engage C2 clutch 126 and B2 brake 134. If high torque is demanded by B2 brake 134, the mode valve actuator 90 is modulated to shift the mode valve 88 to direct additional flow to the high B2 line 97.

To engage fifth gear, the TCM 98 electronically signals the C1 actuator 62 and B2 actuator 66 to stop flow therethrough. Therefore the C2 actuator 64 and B1/B3 actuator 68 are open to flow through and engage C2 clutch 126. The mode valve 88 is not actuated and therefore flow from the B1/B3 passage 76 is directed to B1 brake 132.

Therefore for each of the drive gears, the TCM 98 electronically powers two of the four friction device actuators 62–68 to stop flow therethrough, thereby allowing flow through the other two unpowered friction device actuators to their associated friction device.

To operate the transmission in reverse, the manual valve 50 directs line pressure to the reverse passage 56 and NPR passage 54. The flow in the reverse passage 56 displaces the reverse check ball 61 to pressurize the drive/reverse passage 58. The TCM 98 energizes the C1, C2, and B2 actuators 62–66 to stop flow therethrough. Flow from the NPR passage 54 is directed to engage C3 clutch 124. The B1/B3 actuator 68 permits flow therethrough, and the mode valve actuator 90 is energized to shift the mode valve 88 to direct flow to B3 brake 136.

In the event one or more of the signals from the TCM 98 to an actuator is shorted or if total power is lost, the electro-hydraulic control system 20 provides fail safe operation to minimize the risk of hydraulic fluid flowing to incompatible transmission components, which may result in the engagement of more than one drive ratio.

In particular, simultaneous engagement of the B2 brake 134 and either the B1 or B3 brake 132,136 is not proper as shown in the table of FIG. 2. Therefore if both the B2 actuator 66 and the B1/B3 actuator 68 are not energized when either one or both of the actuators should be energized to stop flow therethrough, the F1 valve 78 operates to protect the system. Flow from the B1/B3 feed passage 76 provides a signal pressure to the F1 valve 78. The B1/B3 pressure is greater than the reference line pressure, therefore the F1 valve 78 shifts to block the B2 feed passage 74 to B2 brake 134. This ensures that B2 brake 134 is not engaged when either the B1 or B3 brake 132,136 is engaged.

As a second example, to achieve $4^{th}$ gear the C1 actuator 62 and B1/B3 actuator 68 are to be energized to close flow therethrough, while C2 and B2 actuators 64,66 remain open. If the C1 actuator 62 remains open, then flow would reach three friction devices, C2 clutch 126, B2 brake 134, and C1 clutch 128. The F2 valve 80 prevents this from occurring. The F2 valve 80 receives signal pressures from B2 feed passage 74 and C2 feed passage 72, (2 of the 3 signal pressures), and therefore the F2 valve shifts to block flow to C1 clutch 128. Fourth gear may be properly achieved.

Similarly, simultaneous engagement of C1 clutch 128 with B1 brake 132 is not proper as shown in FIG. 2. When striving for $1^{st}$ gear, which requires C2 and B2 actuators 64,66 energized, as well as the mode valve actuator 90, flow is directed through C1 feed passage 70 and to B3 feed passage 94 by the mode valve 88. If the mode valve actuator 90 does not turn on but remains closed, then the mode valve 88 directs flow to B1 feed passage 92 and not B3 feed passage 94. Engagement of B1 brake 132 and C1 clutch 128 is improper. The F2 valve 80 receives only a single signal pressure from the B1/B3 feed passage 76 and therefore does not close flow to C1 clutch 128. Instead the F3 valve 82 operates to close flow to C1 clutch 128 due to the B1 feed passage 92 providing a signal pressure to the F3 valve 82. In this case the transmission would default to neutral to protect the transmission.

Commonly if there is any actuator problem, it will involve total system power and not a single actuator. If all system power is lost, all of the friction device actuators 62–68 are open, providing flow therethrough to their respective feed passages. The mode valve actuator 90 is closed and therefore the mode valve 88 is positioned in the default state to direct flow to the B1 feed passage 92. The feed protection valves 78–82 operate to protect the transmission. Flow to B2 brake 134 is blocked by the shifting of the F1 valve 78 initiated by the B1/B3 feed passage signal pressure. Flow to C1 clutch 128 is blocked by shifting of the F2 valve 80 from all three signal pressures, C2, B2, and B1/B3 feed passages 72–76. Therefore the hydraulic control system 20 directs flow to engage the C2 clutch 126 and B1 brake 132 such that the transmission operates in $5^{th}$ gear.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An electro-hydraulic control system for an automatic transmission, comprising:

a source of line fluid pressure including a main pressure regulator valve and a main pressure;

a plurality of fluid operated selectively engageable friction device for establishing a plurality of forward power paths and a reverse power path;

a manual selector valve for operator direction of fluid from said main passage to one of a drive passage and a reverse passage;

a plurality of friction device actuators, each associated with and in flow communication with one of said friction devices, electronically actuated to close fluid flow between said drive passage downstream of said manual valve to said associated friction device;

a plurality of pressure-operated feed protection valve disposed intermediate of said actuators and said associated friction devices to block flow to said friction devices which are incompatible to engage simultaneously;

a two-friction device actuator operatively connected to two of said friction devices and electronically actuated to close fluid flow thereto; and a mode valve and an associated mode valve actuator operative to direct flow from said two-friction device actuator to one of said friction devices operatively connected thereto.

2. An electro-hydraulic control system, as defined in claim 1, wherein one of said friction devices associated with one of said friction device actuators being of the dual area piston type operative to produce a low level torque capacity or a high level torque capacity and wherein said mode valve operates to direct additional flow to a high feed passage to said dual area friction device for generating high level torque capacity.

3. An electro-hydraulic control system for an automatic transmission, comprising:

a source of line fluid pressure including a main pressure regulator valve and a main passage;

a manual selector valve for operator direction of fluid from said main passage;

a drive passage downstream of said manual valve pressurized when drive is selected;

a reverse passage downstream of said manual valve pressurized when reverse is selected;

a drive/reverse passage connecting said drive passage and said reverse passage;

a first check ball disposed between said drive passage and said drive/reverse passage;

a second check ball disposed at one end of said reverse passage and said drive/reverse passage wherein said check balls operate to allow pressurization of said drive/reverse passage when drive is selected by said manual valve without pressurizing said reverse passage and when reverse is selected without pressurizing said drive passage;

six fluid operated selectively engageable friction devices referred to as C1, C2, C3, B1, B2, and B3 for establishing a plurality of forward power paths and a reverse power path;

three friction device actuators including C1 actuator, C2 actuator, and B2 actuator each associated with its respectively named friction device, in parallel relation and electronically actuated to direct fluid from said drive passage to said respectively named friction device;

a two-friction device actuator referred to as B1/B3 actuator operative to direct fluid from said drive/reverse passage to one of said B1 and B3 friction devices; and three pressure-operated feed protection valves referred to as F1, F2 and F3 valves, disposed intermediate of said C1 and B2 actuators and said C1 and B2 friction devices operable to prevent flow to said C1 and B2 friction devices.

4. An electro-hydraulic control system, as defined in claim 3, further comprising:

a multiplex mode valve and an associated mode valve actuator electronically actuated to direct fluid from said drive passage to shift said mode valve to direct flow from said two-friction device B1/B3 actuator to one of said B1 and B3 friction devices operatively connected thereto.

5. An electro-hydraulic control system, as defined in claim 4, wherein said B2 friction device is of the dual area piston type operative to produce a low level torque capacity or a high level torque capacity and wherein said multiplex mode valve is operable to direct flow to a high feed passage to said B2 friction device for generating high level torque capacity.

6. An electro-hydraulic control system, as defined in claim 5, further comprising:

a C1 feed passage extending from said C1 actuator, through said F2 and F3 valves, to said C1 friction device, and is blockable by said F2 and F3 valves;

a C2 feed passage extending from said C2 actuator, through a signal-side of said F2 valve to provide a signal pressure thereto, and to said C2 friction device;

a B2 feed passage extending from said B2 actuator, through said F1 valve, to said B2 friction device and is blockable by said F1 valve, said B2 feed passage further extends from upstream said F1 valve to said signal side of said F2 valve to provide a signal pressure thereto;

a B1/B3 feed passage extending from said B1/B3 actuator to said mode valve, said B1/B3 feed passage further provides signal pressure to said F1 and F2 valves;

a B1 feed passage extending from said mode valve to said B1 friction device, and providing signal pressure to said F3 valve;

a B3 feed passage extending from said mode valve to said B3 friction device wherein operation of said mode valve determines if fluid pressure from said B1/B3 feed passage is delivered to said B1 or B3 feed passage;

and said main passage extending through a reference side of said F1, F2, and F3 valves to provide reference pressure to said F1, F2, and F3 valves.

7. An electro-hydraulic control system, as defined in claim 6, wherein said F1 valve is operable to block flow through said B2 feed passage when said B1/B3 feed passage provides signal pressure thereto.

8. An electro-hydraulic control system, as defined in claim 7, wherein said F3 valve is operable to block flow through said C1 feed passage when said B1 feed passage provides signal pressure thereto.

9. An electro-hydraulic control system, as defined in claim 8, further comprising an NPR passage downstream of said manual valve pressurized when neutral, park, or reverse is selected, and extending to said C3 friction device and to a signal side of said mode valve.

10. An electro-hydraulic control system, as defined in claim 9, further comprising a torque converter clutch control valve, pressure operated to control apply of a torque converter clutch, and wherein said B3 feed passage further extends from said mode valve to a signal pressure end of said torque converter clutch control valve such that said torque converter clutch is not applied when in first gear or reverse.

11. An electro-hydraulic control system, as defined in claim 10, further comprising a pressure switch in said B3 feed passage to signal whether fluid pressure is being delivered to said B3 friction device.

* * * * *